Patented Apr. 9, 1935

1,997,355

UNITED STATES PATENT OFFICE 1,997,355

ELECTRICAL CABLE

Charles R. Boggs, Waban, Mass., assignor to Simplex Wire & Cable Company, Boston, Mass., a corporation of Massachusetts No Drawing. Original application April 7, 1925, Serial No. 21,410. Divided and this application July 15, 1929, Serial No. 378,563. In Canada February 1, 1926

2 Claims. (Cl. 173—264)

This invention relates to improvements in electrical cables; more particularly the invention relates to rubber insulated electrical cables embodying improved rubber insulation described in my application filed April 7, 1925, Serial No. 21,410.

Rubber is usually regarded as a water-proof material and many of its uses depend upon its ability to resist water. Ordinary rubber, however, whether vulcanized or unvulcanized, absorbs water to a marked extent on prolonged exposure, and in time the rubber usually becomes white and flabby. If a sheet of either raw or vulcanized ordinary rubber is soaked in water, being wiped dry and weighed at progressive intervals, it will be found gradually to increase in weight. The volume of the rubber also increases and the result is somewhat similar, on a reduced scale, to the swelling of rubber in organic solvents. This absorption of water by rubber is a material disadvantage where the rubber is employed in electrical insulation, particularly where the insulation is continuously exposed to water. For example, the decrease in specific resistance of the rubber, a measure of its insulating value, may amount to as much as 80% or more of the initial value after the absorption of 1% by volume of water. On prolonged exposure, say for 1,000 to 2,000 hours or more, the absorption in some cases may substantially exceed 100%. This characteristic of ordinary rubber is of primary importance in connection with electrical cables laid under water. Statements have been made that water absorption does not seriously interfere with the electrical properties of rubber insulation exposed to water, and this may be true to a limited extent where vulcanized rubber is employed under certain conditions in low tension installations. In low tension work, the insulation wall can, conveniently and without too great expense, be made thick enough to include a very large factor of safety. The electrical properties of rubber, however, are vitally affected by absorption of even small amounts of water, so much so that there are practically no sub-aqueous high tension cables laid which depend on rubber insulation if exposed to the action of water. If exposed to water, ordinary rubber insulation on low tension cables must be excessively thick. To illustrate the importance of the difficulties encountered, one expedient commonly employed is to enclose the complete cable in a sheathing of lead or the like, a cumbersome and expensive remedy. Attempts have also been made to overcome the difficulty by compounding, but without success. It has also been proposed to reduce the water absorption by the removal of crystalloids, but this proposal does not give entirely satisfactory results particularly where the rubber is exposed to fresh water.

I have discovered that the absorption of water by ordinary rubber, and by compounds made up of ordinary rubber, is due, primarily, to the presence in the rubber of non-rubber constituents which apparently act as protective colloids tending to redisperse, to some extent, the rubber hydrocarbon in the water. I have found the proteins, or albumens, present in ordinary rubber particularly to be agents promoting the absorption of water. Apparently, the rubber globule in latex consists of a hydrocarbon portion surrounded by an envelope of protein, the remainder of the non-rubber constituents being adsorbed on the surface of the globules, and this envelope seems to act as a dispersing agent for the rubber. Resins present in ordinary rubber also have a detrimental effect upon the properties of the rubber with respect to water.

The improved rubber product embodied in the improved cables of the present invention comprises natural rubber substantially free from non-rubber constituents acting to disperse the rubber, and particularly rubber substantially free from rubber dispersing proteins. It is also advantageous to remove resins from the rubber product. This improved rubber product has important advantages in electrical insulation whether employed in the vulcanized or the unvulcanized condition. In referring to natural rubber, I intend to distinguish from synthetic rubber, for example from rubber produced by the polymerization of butadiene, isoprene or dimethyl-butadiene, but not to distinguish between natural rubber vulcanized or unvulcanized. In accordance with the present invention this improved rubber product may also be employed for insulating purposes either alone or in compounded mixture. The rubber product may be vulcanized with inorganic or organic vulcanization accelerators in the usual way. The invention thus provides in combination with an electrical conductor, an improved rubber for use in electrical insulation which is of satisfactory electrical properties with respect to water and which is adapted for use in either salt water or fresh water without being subject to serious electrical deterioration on prolonged exposure.

The improved rubber product embodied in the improved cables of the present invention is characterized by its ability to resist water, that is by the very low rate at which it absorbs water if at all. A convenient test to determine the ability of rubber to resist water may be carried out as follows: Press a sheet of the rubber in a frame 0.073" thick between parallel sheets of aluminum in a vulcanizing press for 30 minutes at 102° C., immerse the pressed sheet in water at 70° C. for 20 hours, and determine the absorption of water by weighing before and after immersion, the rubber sheet being wiped dry before weighing. In carrying out the test, the sheets produced should be of uniform thickness and with smooth faces. The absorption of water in units of weight of water per unit of area of surface of the sheets can thus be determined. With the improved rubber product embodied in the improved cables of the present invention, the water absorption in grams of water per square inch of surface area of the rubber in the unvulcanized state in the above test may not substantially exceed 0.010. Vulcanized samples may be tested in a similar way by curing the sample in the frame in the press and then immersing the vulcanized sheet. With vulcanized samples it may be convenient to employ a longer time of immersion, for example from 100 to 200 hours.

The improved rubber for use as insulation in the devices of the present invention may be prepared in several ways. One method is to dissolve the rubber in a solvent which does not dissolve the rubber dispersing proteins, such as benzene or chloroform, and after mechanically separating the undissolved non-rubber constituents recovering the rubber from the solvent, either by evaporation or precipitation.

As employed in insulating electrical cables, the conducting core of the cable is covered with an insulating wall of the improved rubber of the invention. The rubber may be used vulcanized or unvulcanized. Vulcanization can be carried out with sulfur and an inorganic or organic vulcanization accelerator in the usual way. The insulating wall may include in addition to the improved rubber one or more suitable fillers or compounding agents. One suitable filler is comminuted vulcanized rubber, advantageously produced by vulcanization of the improved rubber product of the present invention. Cables so insulated may be subjected to prolonged exposure to either salt water or fresh water without deterioration of the insulation.

In defining the improved cable of the present invention in the appended claims as a cable including an exposed insulating covering of a specified rubber, it is the intention to exclude cables in which the insulating covering is enclosed in an outer casing of other material that is impervious to moisture. However, by the use of the term "exposed" it is not intended to exclude cables in which the insulating rubber covering is surrounded by a layer or layers of other materials that are not impervious to water, since in the the latter class of cables the insulating covering actually is exposed to any water to which the cable is itself exposed.

I claim:

1. In a system suitable for use involving prolonged exposure to water, the combination of an electrical conductor and an exposed electrical insulating element comprising rubber of natural origin substantially free from proteins insoluble in benzene or chloroform, said rubber in the unvulcanized state absorbing not more than 0.010 gram of water per square inch of surface area after immersion of a sheet 0.073" thick in fresh water at 70° C. for 20 hours.

2. An improved electrical cable suitable for use involving prolonged exposure to water, comprising a conducting core and an exposed insulating covering of rubber of natural origin capable of standing prolonged exposure to water, said rubber being substantially free from proteins insoluble in benzene or chloroform and in the unvulcanized state absorbing not more than about 0.010 gram of water per square inch of surface area after immersion of a sheet 0.073" thick in fresh water at 70° C. for 20 hours.

CHARLES R. BOGGS.